US012697575B2

(12) United States Patent
Wang et al.

(10) Patent No.: US 12,697,575 B2
(45) Date of Patent: Aug. 4, 2026

(54) DUST COLLECTOR

(71) Applicants: TRINITY INDUSTRIAL CORPORATION, Toyota (JP); TOYOTA JIDOSHA KABUSHIKI KAISHA, Toyota (JP)

(72) Inventors: Xu Wang, Toyota (JP); Shoji Kuramoto, Toyota (JP); Seishiro Ueno, Toyota (JP); Takashi Hashimoto, Nagoya (JP); Shingo Kurumatani, Toyota (JP); Shigeki Fujiwara, Toyota (JP)

(73) Assignees: TRINITY INDUSTRIAL CORP., Toyota (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 398 days.

(21) Appl. No.: 18/278,472

(22) PCT Filed: Mar. 18, 2021

(86) PCT No.: PCT/JP2021/011113
§ 371 (c)(1),
(2) Date: Aug. 23, 2023

(87) PCT Pub. No.: WO2022/195808
PCT Pub. Date: Sep. 22, 2022

(65) Prior Publication Data
US 2024/0149206 A1 May 9, 2024

(51) Int. Cl.
*B01D 47/02* (2006.01)
*B01D 47/10* (2006.01)

(52) U.S. Cl.
CPC ........... *B01D 47/024* (2013.01); *B01D 47/10* (2013.01)

(58) Field of Classification Search
CPC .. B01D 47/024; B01D 47/10; B01D 46/0004; B01D 46/62; B01D 47/06; B01D 50/00; B01D 50/60
See application file for complete search history.

(56) References Cited

U.S. PATENT DOCUMENTS 2,484,277 A * 10/1949 Fisher ................... B01D 47/10
96/275
3,448,562 A * 6/1969 Wisting ................. B01D 47/10
95/224

(Continued)

FOREIGN PATENT DOCUMENTS

CN 2095343 U 2/1992
CN 201059571 Y 5/2008

(Continued)

OTHER PUBLICATIONS

Translation of JPH043617Y2 (Year: 1992).*

(Continued)

*Primary Examiner* — Jennifer Dieterle
*Assistant Examiner* — Phillip Y Shao
(74) *Attorney, Agent, or Firm* — Oliff PLC

(57) ABSTRACT

A dust collector that collects welding fumes includes: a tank that stores water in a non-full state; a first tower that stands upright from an upper surface of the tank, and is configured to receive air containing the welding fumes from an upper part of the first tower and to guide the air to the tank; a second tower that stands upright from the upper surface of the tank, and is configured such that air discharged from the tank passes through the second tower; a bottleneck structure portion in which a vertically intermediate part of the first tower is narrowed; a mist generator configured to generate mist in the first tower; and a filter housed in the second tower.

20 Claims, 10 Drawing Sheets

(56) References Cited

U.S. PATENT DOCUMENTS

| | | | | |
|---|---|---|---|---|
| 4,643,742 | A | * | 2/1987 | Hammarskog ........ B01D 47/10 |
| | | | | 95/225 |
| 6,102,990 | A | * | 8/2000 | Keinanen ............... F23J 15/022 |
| | | | | 96/275 |
| 6,391,099 | B1 | * | 5/2002 | Ina ......................... B01D 47/10 |
| | | | | 96/275 |

FOREIGN PATENT DOCUMENTS

| | | | |
|---|---|---|---|
| CN | 102657991 | A | 9/2012 |
| CN | 103372359 | A | 10/2013 |
| CN | 109107322 | A | 1/2019 |
| EP | 0 589 174 | A1 | 3/1994 |
| GB | 2 018 156 | A | 10/1979 |
| JP | S49-32271 | A | 3/1974 |
| JP | S50-122375 | U | 10/1975 |
| JP | S52-38147 | U | 3/1977 |
| JP | S54-132875 | A | 10/1979 |
| JP | S56-220 | U | 1/1981 |
| JP | S58-30323 | A | 2/1983 |
| JP | S61-97014 | A | 5/1986 |
| JP | S62-62824 | U | 4/1987 |
| JP | H043617 | Y2 | * 2/1992 |
| JP | H104-298213 | A | 10/1992 |
| JP | 2000-279737 | A | 10/2000 |
| JP | 2005-046671 | A | 2/2005 |
| JP | 2012-081454 | A | 4/2012 |
| JP | 2018-012057 | A | 1/2018 |
| JP | 2018-111062 | A | 7/2018 |
| JP | 2021-058846 | A | 4/2021 |
| SG | 194321 | A1 | 11/2013 |

OTHER PUBLICATIONS

Sep. 7, 2022 Office Action issued in Japanese Patent Application No. 2019-184766.

Feb. 16, 2023 Office Action issued in Japanese Patent Application No. 2019-184766.

May 18, 2021 International Search Report issued in International Patent Application No. PCT/JP2021/011113.

May 18, 2021 Written Opinion of the International Searching Authority issued in International Patent Application No. PCT/JP2021/011113.

Aug. 1, 2025 Office Action issued in Chinese Patent Application No. 202180094915.1.

Mar. 27, 2026 Office Action issued in Chinese Application No. 202180094915.1.

May 19, 2026 Decision of Refusal issued in Chinese Application No. 202180094915.1.

* cited by examiner

DUST COLLECTOR

TECHNICAL FIELD

The present disclosure relates to a dust collector that collects welding fumes.

BACKGROUND ART

Conventionally, this type of dust collector has the following structure. An inside of a case in which water is stored in the bottom part is partitioned into a spray chamber and a filter housing chamber. Air containing welding fumes moves from the top to the bottom in the spray chamber, then moves laterally on the stored water, and further moves in the filter housing chamber from the bottom to the top (see, Patent Document 1, for example).

RELATED ART DOCUMENT

Patent Document

Patent Document 1: JP S62-62824 U (FIG. 1)

SUMMARY OF THE INVENTION

Technical Problems to be Solved by the Invention

However, there is a demand for development of a dust collector more compact than the conventional dust collector described above.

Means of Solving the Problems

A dust collector according to one aspect of the present invention that is made to solve the above problem collects welding fumes and includes: a tank that stores water in a non-full state; a first tower that stands upright from an upper surface of the tank, and is configured to receive air containing the welding fumes from an upper part of the first tower, and to guide the air to the tank; a second tower that stands upright from the upper surface of the tank and is configured such that air discharged from the tank passes through the second tower; a bottleneck structure portion in which a vertically intermediate part of the first tower is narrowed; a mist generator configured to generate mist in the first tower; and a filter housed in the second tower.

BRIEF DESCRIPTION OF THE DRAWINGS

FIG. 3 is a plan view of the dust collector.

FIG. 9 is a front view of a dust collector according to a modification.

MODE FOR CARRYING OUT THE INVENTION

Hereinafter, one embodiment of a dust collector 10 illustrated in FIGS. 1 to 6 will be described. The dust collector 10 of the present embodiment is provided in arc welding equipment.

Figure 1:
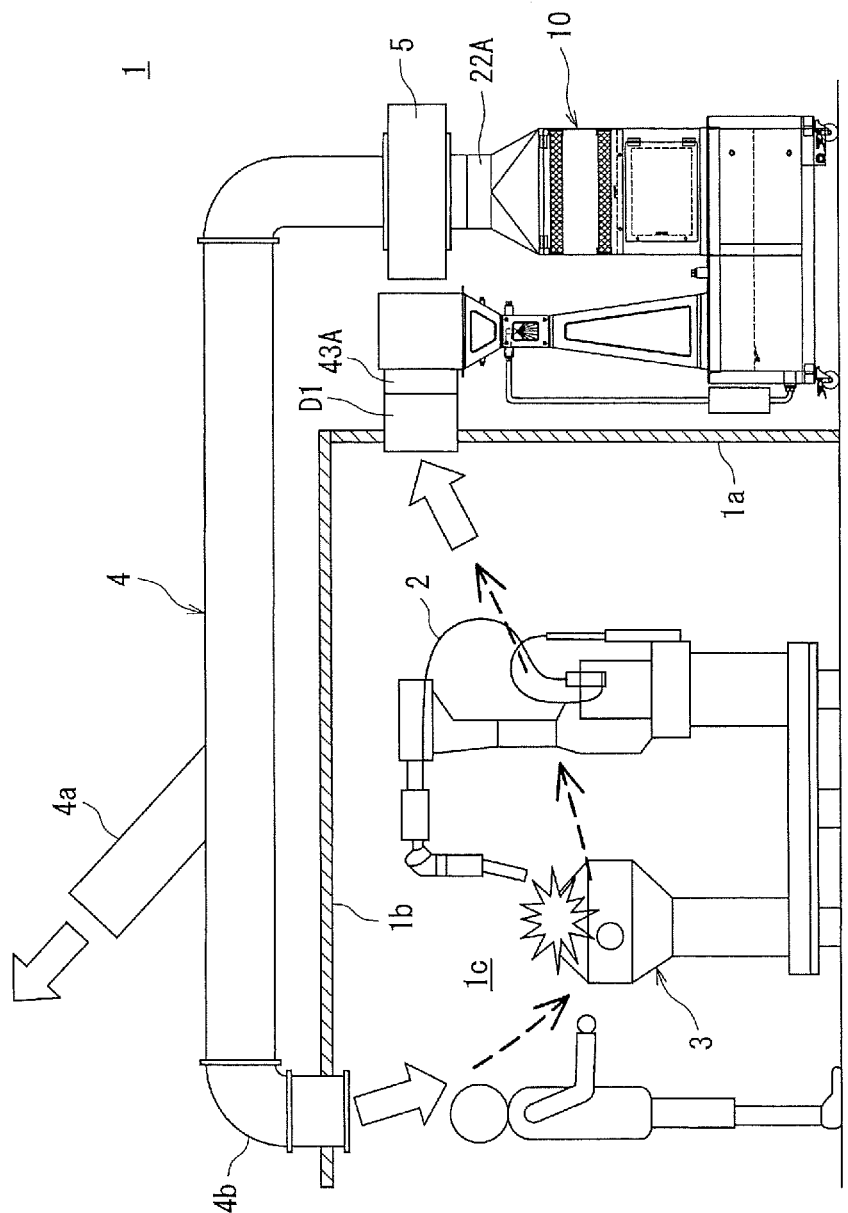
FIG. 1 is a cross-sectional view illustrating arc welding equipment including a dust collector according to an embodiment.

FIG. 1 is a diagram illustrating a schematic configuration of arc welding equipment 1 including the dust collector 10 according to the present embodiment. As illustrated in FIG. 1, the arc welding equipment 1 includes an arc welding device 2, a workbench 3, a dust collector 10, and an exhaust duct 4.

The arc welding device 2 is installed in a welding work area 1c surrounded by a wall member 1a and a ceiling 1b, and is constituted by, for example, a known welding robot. A workpiece to be welded is placed on the workbench 3, and the workpiece is welded by the arc welding device 2.

A dust collector 10 is installed outside the welding work area 1c, and the dust collector 10 collects and processes welding fumes and the like caused by spatter and the like generated during welding work using the arc welding device 2. The collection and process of the welding fumes and the like by the dust collector 10 will be described later.

The dust collector 10 is provided with an air introduction portion 43A, and the inside of the air introduction portion 43A communicates with the welding work area 1c via a duct D1 passing through the wall member 1a.

The dust collector 10 is also provided with an air discharge portion 22A, and the air discharge portion 22A communicates with the exhaust duct 4. The exhaust duct 4 is disposed from an upper part of the dust collector 10 to an upper part of the ceiling 1b, and is branched into an indoor exhaust duct 4a and a return duct 4b. The indoor exhaust duct 4a discharges part of the air processed by the dust collector 10, into an indoor area (inside a factory or the like). The return duct 4b is connected to the ceiling 1b above the workbench 3, and returns part of the air processed by the dust collector 10 into the welding work area 1c. Therefore, in the welding work area 1c, an air flow is generated from the downstream end of the return duct 4b (the opening opened toward the welding work area 1c) toward the air introduction portion 43A of the dust collector 10 (see the dashed arrows in FIGS. 1 and 2), and the welding fumes generated during welding work are caused to flow toward the dust collector 10. As described above, the arc welding equipment 1 according to the present embodiment is configured as a circulative fume exhaust system.

Figure 2:
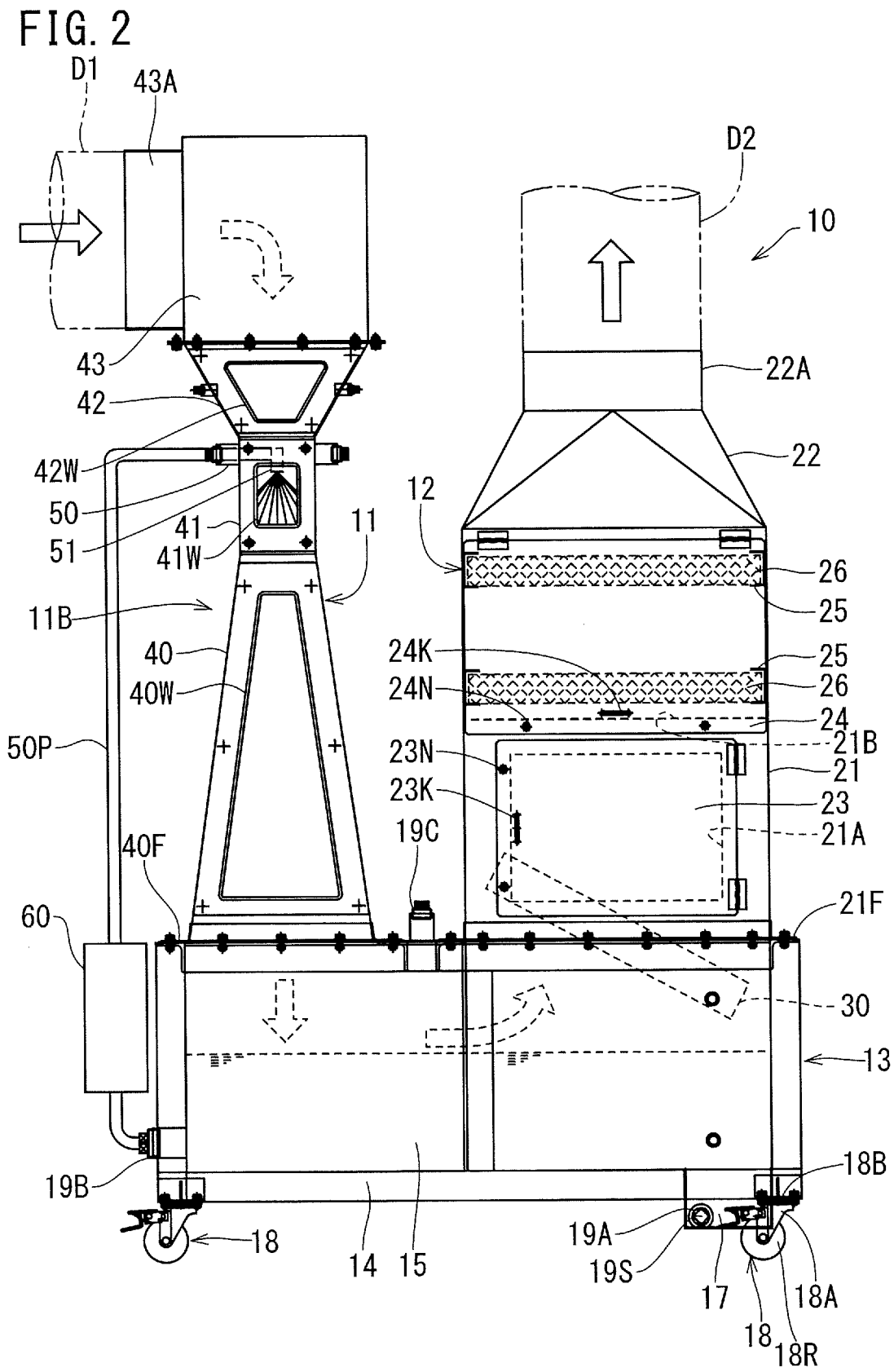
FIG. 2 is a front view of the dust collector.

As illustrated in FIG. 2, the dust collector 10 of the present embodiment has a structure in which the first tower 11 and the second tower 12 stand upright from the upper surface of the tank 13.

The tank 13 is formed by, for example, welding a plurality of angle members or channel members to form a frame structure 14 in a rectangular parallelepiped shape in a state where metal plates 15 are placed on four inner side surfaces, a bottom surface, and an upper surface of the frame structure 14. The planar shape of the tank 13 is, for example, a rectangular shape in which the long side is substantially twice the short side. As described above, since a strength of the tank 13 of the present embodiment is secured by the frame structure 14, the metal plates 15 can be thinned, and the tank can be made lighter and stronger than a tank in which the strength is secured only by the metal plates 15.

In the metal plate 15 disposed on the bottom surface of the tank 13 there is formed a through-hole 15A (see FIG. 3) such that one corner of the metal plate 15 is cut out in a quadrangular shape, and a box-shaped expanded portion 17 is welded to a lower-side edge of the through-hole 15A. A drain nozzle 19A protrudes from one side surface of the expanded portion 17, and the drain nozzle 19A is closed with a plug 17S.

Figure 3:
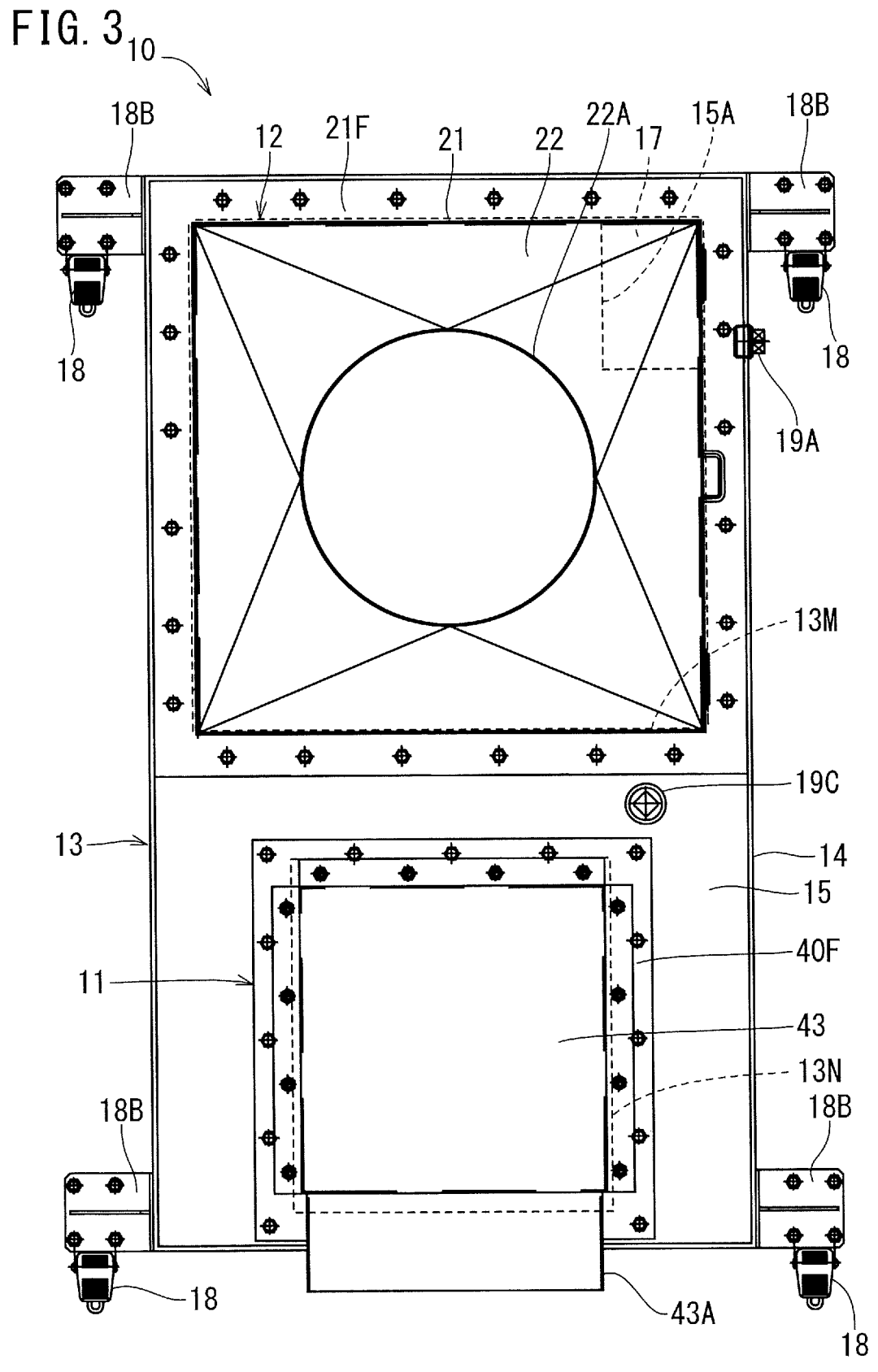

As illustrated in FIG. 3, brackets 18B are overhung sideward from the lower side surfaces at the four corners of the frame structure 14, and casters 18 are attached to the lower surfaces of the brackets 18B. As illustrated in FIG. 2, each caster 18 has a brake, and a support arm 18A supporting a roller 18R to be turnable with respect to the bracket 18B.

As illustrated in FIG. 3, a first opening 13N and a second opening 13M both having a square shape are formed in the upper surface of the tank 13. The first opening 13N is disposed at one longitudinal end of the upper surface of the tank 13 and at the center in the short-side direction. The first opening 13N is closed by the first tower 11. On the other hand, one side of the square of the second opening 13M has the same length as the distance between a pair of side walls on the long-side side in the tank 13, and the second opening 13M is disposed near the other longitudinal end of the upper surface of tank 13. The second opening 13M is closed by the second tower 12. A water supply nozzle 19C is provided between the first opening 13N and the second opening 13M. In the tank 13, water (water for extinguishing welding fumes) is stored such that the surface of the water (denoted by a dashed line in the tank 13 in FIG. 2) is at a position slightly lower than the upper surface.

As illustrated in FIG. 2, the first tower 11 has a bottleneck structure portion 11B and a head portion 43, whose horizontal cross-sections are, for example, square. The bottleneck structure portion 11B includes: a lower pyramid portion 40 that has a quadrangular pyramid shape and rises from the tank 13 and that is gradually narrowed upward; a throat portion 41 having a rectangular cylindrical shape extending upward from the upper end part of the lower pyramid portion 40; and an upper pyramid portion 42 that has a rectangular pyramid shape and that gradually expands upward from the upper end of the throat portion 41. A flange 40F extending from the lower end of the lower pyramid portion 40 in four directions is bolted to the opening edge of the above-described first opening 13N.

In detail, an opening angle (expansion angle) between the opposing surfaces of the upper pyramid portion 42 is, for example, 55 to 65 degrees, and an opening area at the upper end of the upper pyramid portion 42 is, for example, 5 to 7 times the opening area at the lower end. The throat portion 41 has a height of about 1 to 1.5 times the height of the upper pyramid portion 42. Furthermore, the lower pyramid portion 40 has a height of about 3 to 5 times the height of the upper pyramid portion 42, and the opening angle (expansion angle) between the opposing surfaces of the lower pyramid portion 40 is, for example, 10 to 20 degrees. An upper end opening of the lower pyramid portion 40 and a lower end opening of the upper pyramid portion 42 have substantially the same size, and a lower end opening of the lower pyramid portion 40 and an upper end opening of the upper pyramid portion 42 have substantially the same size.

In the lower pyramid portion 40, the throat portion 41, and the upper pyramid portion 42, there are respectively formed window portions 40W, 41W, and 42W, each of which is formed such that the entire front side wall except the outer edge part thereof is formed with a light-transmitting member (for example, a glass plate or an acrylic plate).

A spray nozzle 50 is penetratingly fixed to the throat portion 41 at a position near the upper end of the side surface which is opposite to the second tower 12. The spray nozzle 50 is bent downward at a right angle in the throat portion 41, and a portion lower than the bent part is disposed on the central axis of the throat portion 41. An ejection port of a pump 60 is connected to a base end part of the spray nozzle 50 via a pipe 50P, and a suction port of the pump 60 is connected to a nozzle 19B of the tank 13. Then, the water in the tank 13 is sucked by the pump 60, and mist is ejected downward from an ejection port 51 at the tip of the spray nozzle 50. The mist ejected from the ejection port 51 can be visually recognized through the window portion 41W of the throat portion 41. In addition, it is possible to easily recognize the degree of contamination in the bottleneck structure portion 11B through the quadrangular window portions 40W, 41W, and 42W.

The head portion 43 has a rectangular parallelepiped shape extending upward from the upper end of the upper pyramid portion 42 and has the air introduction portion 43A having a circular cylindrical shape and protruding from the side surface opposite to the second tower 12. Then, the duct D1 is connected to the air introduction portion 43A, and, for example, air containing the welding fumes generated by arc welding flows into the head portion 43 through the duct D1.

The second tower 12 includes a reducer 22 on a second tower body 21 extending in the vertical direction. The horizontal cross-section of the second tower body 21 has a square shape, and a lower end opening of the second tower body 21 has substantially the same size as the second opening 13M of the above-described tank 13. The lower end opening of the second tower body 21 is placed on the second opening 13M of the tank 13, and a flange 21F protruding from the lower end of the second tower body 21 in four directions is bolted to the opening edge of the second opening 13M.

The second tower body 21 is equal to or slightly higher than the lower pyramid portion 40 of the first tower 11, and an inner opening area in the horizontal cross-section (that is, a flow path cross-sectional area) of the second tower body 21 is 10 to 20 times (more specifically, 15 to 18 times) the inner opening area in the horizontal cross-section of the throat portion 41 (that is, the flow path cross-sectional area).

In the side wall of the second tower body 21 on the front side, a first opening 21A is formed at a lower part, and a second opening 21B is formed at an upper part, and the first opening 21A and the second opening 21B are respectively opened and closed by doors 23 and 24. The second opening 21B is formed by cutting out the front side wall of the second tower body 21 from a position near the upper end to a vertically intermediate position and, horizontally entirely. Furthermore, the door 24 is hinge-connected to an upper edge part of the second opening 21B, and the door 24 is normally fixed to a lower edge part of the second opening 21B with bolts 24N. On the other hand, the first opening 21A is formed by cutting off a quadrangle smaller than the second opening 21B, from the front side wall of the second tower body 21 between positions near both lateral ends. Then, the door 23 is hinge-connected to one side edge part of the first opening 21A, and the door 23 is normally fixed to the other side edge part of the first opening 21A with bolts 23N.

Gate-shaped handles 23K and 24K are provided at end parts, of the doors 23 and 24, opposite to the rotation centers.

Filters 26 and 26 are respectively provided at a position near the upper end and a vertically intermediate position of the second tower body 21. The filter 26 has a structure in which, for example, a plurality of punched metal sheets each formed by punching a plurality of holes in a metal plate are stacked with gaps therebetween. The gap is formed by sandwiching a frame-shaped spacer between the punched metal sheets, for example. The filter 26 may be a woven fabric or a non-woven fabric.

Support rails 25 to support the filters 26 are attached, one at a position near the upper end of the second tower body 21 and the other at a vertically intermediate position. The support rails 25 have a quadrangular groove structure extending from the second opening 21B into the second tower body 21 in the depth direction, and are disposed at a position near the upper end and the vertically intermediate position of the inner surface of the second tower body 21 so as to oppose each other. Both side parts of each filter 26 are slidably engaged with the support rails 25 and 25, and the filter 26 can be inserted and removed through the second opening 21B.

An eliminator 30 is attached to a lower end part of the second tower body 21. The eliminator 30 includes a plurality of elongated barrier members 31 extending in the direction perpendicular to the paper surface of FIG. 4. Each of the barrier members 31 has a structure including a strip-shaped plate 31A and side walls 31B perpendicular to the side part of the strip-shaped plate 31A, and the tip parts of each side wall 31B are bent at a right angle in the directions to face the strip-shaped plate 31A. In addition, a barrier layer 32 is configured such that the plurality of barrier members 31 are arranged in a side-by-side manner in a state where the strip-shaped plates 31A are disposed on the same plane, and three or more such barrier layers 32 are stacked with gaps 33B therebetween. Furthermore, a gap 33A between the barrier members 31 and 31 that are adjacent to each other in each barrier layer 32 is narrower than each barrier member 31. Each of the barrier members 31 of one barrier layer 32 faces one of gaps 33A of the neighboring barrier layer 32. Furthermore, the barrier layers 32 are arranged such that any gap 33A of a barrier layer 32 that is inwardly adjacent to an outer barrier layer 32 cannot be visually recognized through gaps 33A of the outer barrier layer 32. In addition, longitudinal both end parts of a group of the barrier members 31 included in the plurality of barrier layers 32 are connected to support members (not shown), and the eliminator 30 is fixed to the second tower body 21 in a state where the support members are placed on the inner surfaces having the first opening 21A and the opposing surface thereof in the second tower body 21. Furthermore, the eliminator 30 is inclined downward as separating from the first tower 11. Note that the disposed position and orientation of the eliminator 30 are not limited to those described above, and may be disposed to extend in the horizontal direction at the lower end part of the second tower body 21.

As illustrated in FIG. 2, the reducer 22 has a structure in which the flow path cross-sectional area is gradually reduced upward, and has the air discharge portion 22A having a circular cylindrical shape at the upper end part. A blower (not illustrated) is connected to the air discharge portion 22A via the duct D2, and the inside of the dust collector 10 is brought into a negative pressure state by the blower. In the dust collector 10 of the present embodiment, air flows downward in the lower pyramid portion 40 of the first tower 11 at a flow velocity of, for example, 50 to 60 m/s, and air flows upward in the second tower body 21 of the second tower 12 at a flow velocity of, for example, 2 to 4 m/s.

Specific dimensions of each part of the dust collector 10 according to the present embodiment are as follows: the height dimension of the first tower 11 is about 1,000 mm, the width dimensions of the upper end of the upper pyramid portion 42 and the lower end of the lower pyramid portion 40 are about 300 mm, the height dimension of the second tower 12 is about 700 mm, the width dimension of the second tower 12 is about 500 mm, the height dimension of the tank 13 is about 450 mm, and the width dimension of the tank 13 is about 1,000 mm. These dimensions are not limited thereto, and can be set as desired. The height dimension of the second tower 12 may be set larger than the height dimension of the first tower 11.

The configuration of the dust collector 10 of the present embodiment has been described above. Next, the action and effect of the dust collector 10 will be described. As described above, the inside of the dust collector 10 is brought into a negative pressure state, and air containing welding fumes is taken into the upper portion (head portion 43) of the first tower 11. Then, the mist ejected into the throat portion 41 of the bottleneck structure portion 11B and the welding fumes are mixed. Since the upper pyramid portion 42 is shorter and more widely expanded than the lower pyramid portion 40, particles of the welding fumes are accelerated and collected toward the center of the throat portion 41, and the particles of the welding fumes are easily mixed with the particles of the mist. In addition, since the lower pyramid portion 40 is longer and less widely expanded than the upper pyramid portion 42 above the throat portion 41, the particles of the welding fumes and the particles of the mist get coupled while moving over a long distance, so that the coupling efficiency is improved. Furthermore, since the spray nozzle 50 ejects the mist downward, it is possible to smoothly eject the mist along the air flow.

The air containing the mist coupled with the welding fumes flows down from the first tower 11 into the tank 13. In the present embodiment, since air is taken in from the side surface opposite to the second tower 12 in the upper part of the first tower 11, the air flows down along the inner side surface of the first tower 11 on the second tower 12 side. As a result, part of the air that has collided with the stored water in the tank 13 rolls up to the side opposite to the second tower 12 in the first tower 11 and circulates in the first tower 11. Moreover, since the first tower 11 has a rectangular cylindrical shape, the air flows along the flat inner side surface of the first tower 11 and therefore smoothly circulates. As a result, removal of the welding fumes is accelerated.

Furthermore, the welding fumes coalesce with the mist (water droplets), thereby forming granular bodies having large mass. That is, the granular bodies (granular bodies constituted by welding fumes and water droplets having coalesced with each other) flowing out from the throat portion 41 toward the tank 13 have large mass and flow toward the water surface of the tank 13 at high flow velocity. Therefore, high inertial force of the granular bodies makes the granular bodies hit against the water surface of the tank 13. As a result, the welding fumes contained in the granular bodies are reliably extinguished by contact with the water in the tank 13 and are collected in the tank 13, and this accelerates removal of the welding fumes.

Figure 4:
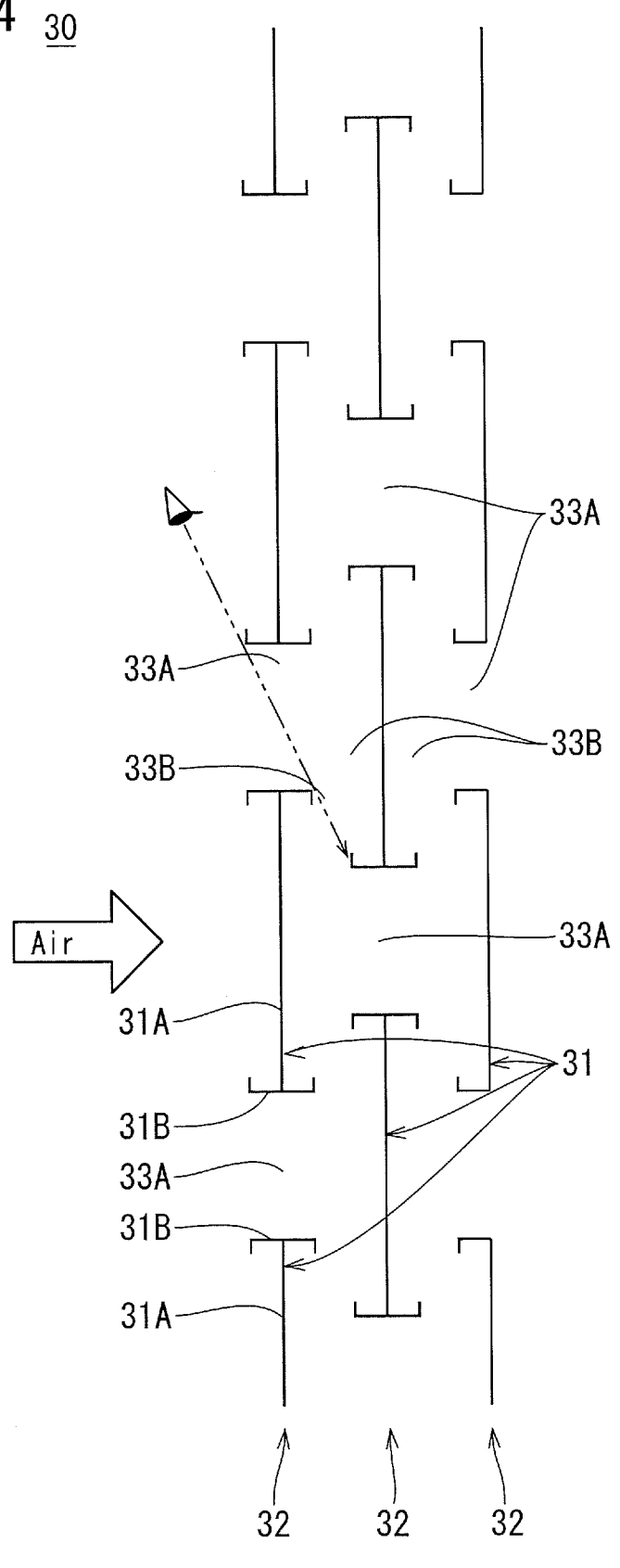
FIG. 4 is a cross-sectional side view of an eliminator of the dust collector.

The remaining portion of the air flowing down from the first tower 11 into the tank 13 passes over the stored water in the tank 13 and flows toward the second tower 12. Then, a large-sized mist is removed from the air by the eliminator 30 at an inlet part to the second tower 12. In the eliminator 30, as shown in FIG. 4, the barrier layers 32 are arranged such that any gap 33A of a barrier layer 32 that is inwardly adjacent to an outer barrier layer 32 cannot be visually recognized through gaps 33A of the outer barrier layer 32. That is, the gaps 33A and 33A are not arranged on a straight line between the adjacent barrier layers 32 and 32. As a result, the air passing through the eliminator 30 meanders sufficiently. Then, the mist containing the welding fumes is caught by the side walls 31B of the barrier members 31 constituting each barrier layer 32, so that the mist becomes water droplets and joins the stored water in the tank 13. The mist not removed by the eliminator 30 ascends in the second tower 12 and is removed by the plurality of filters 26. Then, the air flows from the upper end of the second tower 12 to the duct D2 outside the dust collector 10, and is then discharged to the atmosphere.

As described above, in the dust collector 10 of the present embodiment, the following towers are separately provided and stand upright from the upper surface of the tank 13: the first tower 11 having the space in which the particles of mist and the particles of welding fumes are coupled with each other; and the second tower 12 having the space in which the filters 26 are housed. Therefore, wasted space is reduced as compared with the conventional dust collector in which the inside of the case is partitioned to provide the both spaces, and the dust collector 10 can be downsized and reduced in weight. Furthermore, since the dust collector 10 can be downsized and reduced in weight, the dust collector 10 can be easily moved when the casters 18 are provided.

Figure 5:
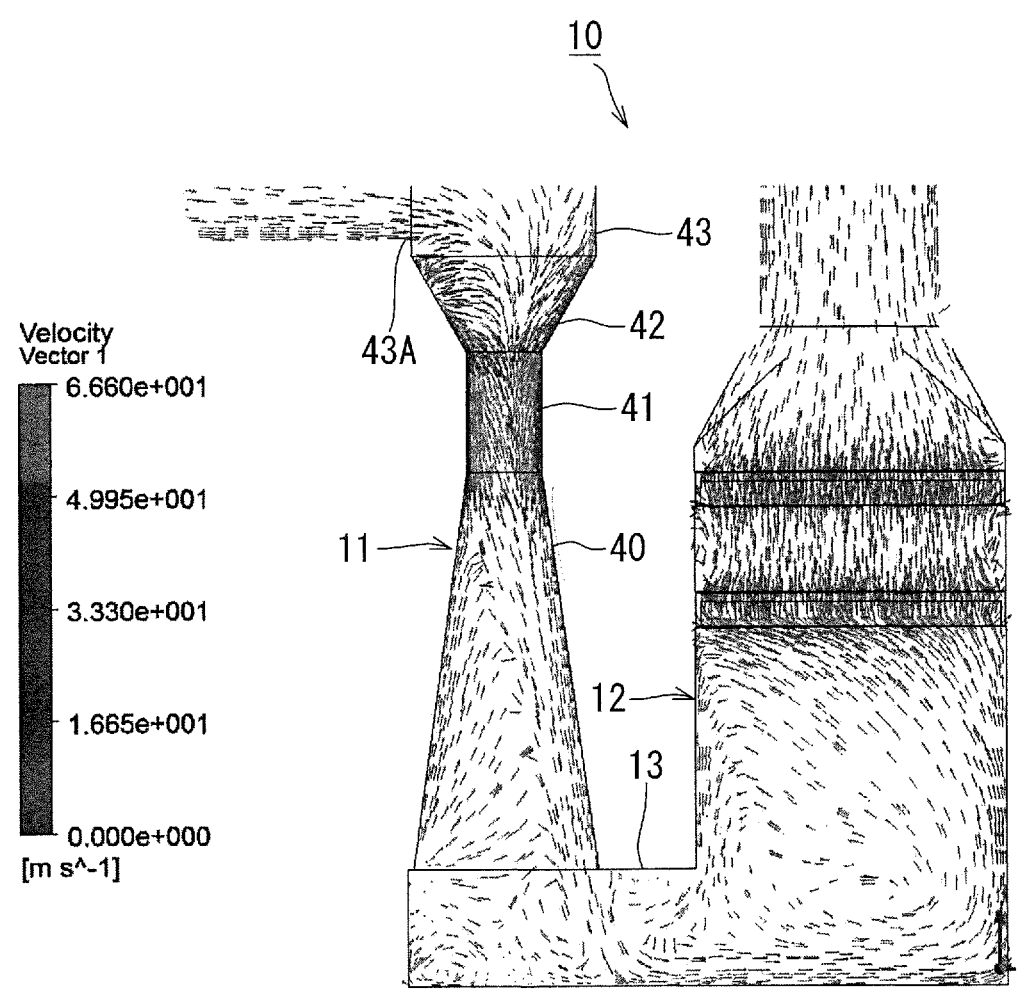
FIG. 5 is a cross-sectional side view of the dust collector showing an air flow by simulation.

FIG. 5 illustrates a wind direction in the dust collector 10 by simulation. In this simulation, the eliminator 30 is removed, and the other components are the same as in the structure of the above-described dust collector 10. As illustrated in the drawing, in the dust collector 10, the following state can be confirmed; most of the air flowing into the head portion 43, which is above the tank 13, from the side opposite to the second tower 12 is transmitted along the wall surface of the first tower 11, facing the second tower 12; and part of the air bounces back at the liquid surface of the tank 13 and rolls up to circulate on the side opposite to the second tower 12 in the lower pyramid portion 40. It can also be confirmed that the remaining portion of the air flows over the stored water in the tank 13 rolls up along the inner surface opposite to the first tower 11 in the second tower 12, and circulates in the second tower 12.

Advantageous Effects of Embodiment

As described above, in the present embodiment, when air containing welding fumes at a high temperature passes through the throat portion 41, the flow velocity of the air is increased in the throat portion 41, because the passage cross-sectional area of the throat portion 41 is set to be small by the upper pyramid portion 42 and the lower pyramid portion 40. Furthermore, since the mist (water droplets) is ejected from the spray nozzle 50 in the throat portion 41, the welding fumes and the water droplets flowing at high speed together with the air collide each other in the throat portion 41 and thereby coalesce with each other. The welding fumes and the water droplets form granular bodies having large mass. That is, the granular bodies (granular bodies constituted by welding fumes and water droplets having coalesced with each other) flowing out from the throat portion 41 toward the tank 13 have large mass and flow toward the water surface of the tank 13 (flow in the direction intersecting the water surface) at high flow velocity. Therefore, high inertial force of the granular bodies makes the granular bodies hit against the water surface of the tank 13. As a result, the welding fumes contained in the granular bodies are reliably extinguished by contact with the water in the tank 13 and are collected in the tank 13 (deposited in the tank 13). As the welding fumes are collected in the tank 13 in this manner, it is possible to sufficiently improve recovery efficiency of welding fumes. Since the recovery efficiency of welding fumes can be sufficiently improved in this manner, the air discharged from the dust collector 10 can be returned to an indoor area by the indoor exhaust duct 4a. That is, there is no need to discharge the air containing welding fumes to an outdoor area, and adverse effects on the environment can be greatly mitigated. In addition, since it is not necessary to provide equipment for purifying the air discharged from the dust collector 10, the arc welding equipment 1 is not increased in size and cost, so that it is possible to achieve a highly practical arc welding equipment 1.

Figure 6:
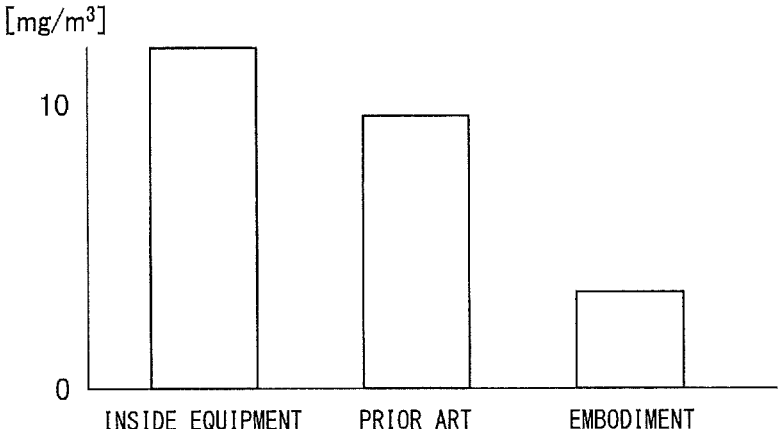
FIG. 6 is a diagram illustrating measurement results of a dust concentration in each of a conventional dust collector and a dust collector according to a first embodiment.

FIG. 6 is a diagram illustrating measurement results of the dust concentration (concentration of dust contained in the discharged air) in each of the dust collector disclosed in JP 2018-111062 A (hereinafter, simply referred to as a "conventional dust collector") and the dust collector 10 according to the present embodiment.

As can be seen from FIG. 6, a welding fume concentration associated with welding work in an equipment (welding work area 1c) was about 12 mg/m$^3$, and the welding fume concentration in the air discharged from the conventional dust collector was about 9.5 mg/m$^3$; however, the welding fume concentration in the air discharged from the dust collector 10 according to the present embodiment was about 3.0 mg/m$^3$. That is, with the dust collector 10 of the present embodiment, it is possible to achieve a dust removing performance (dust removing efficiency) of 3 times or more as compared with the conventional dust collector. As a result, the above-described effect has been confirmed.

In the present embodiment, as described above, the downstream side of the exhaust duct 4 that discharges the air from the dust collector 10 is branched into the indoor exhaust duct 4a and the return duct 4b. With this configuration, the flow velocity of the air flowing through the welding work area 1c (flow velocity of air flowing from the downstream end of the return duct 4b toward the air introduction portion 43A of dust collector 10) is not unnecessarily high as compared with the case where the entire amount of air from the dust collector 10 is returned to the welding work area 1c by the return duct 4b. This is because such a situation is considered where, when the flow velocity of the air flowing through the welding work area 1c is too high, the high flow velocity may adversely affect welding of a workpiece by the arc welding device 2 (adversely affects quality of welding). That is, by causing part of the air discharged from the dust collector 10 to flow into the indoor exhaust duct 4a, the amount of air flowing through the return duct 4b is reduced so as to avoid a situation in which the flow velocity of the air flowing through the welding work area 1c becomes too high, whereby favorable welding quality can be obtained.

[Optimal Conditions Based on Experiments]

The inventors of the present invention conducted experiments for obtaining optimal conditions for sufficiently improving the recovery efficiency of the welding fumes in the dust collector 10 configured as described above. Specifically, these optimal conditions were obtained by changing the followings: a water ejection amount from the spray nozzle 50; a water ejection angle from the spray nozzle 50; the passage cross-sectional area of the throat portion 41; a length of the throat portion 41; and a water surface height in the tank 13. The results are as follows.

(1) Water Ejection Amount from Spray Nozzle 50

An optimal water ejection amount from the spray nozzle 50 is in a range from 20 to 22 l/min. The present experiments have shown that when the water ejection amount exceeds 22 l/min, the diameter of the water droplets ejected from the spray nozzle 50 becomes too large, whereby the collision rate between the water droplets and the welding fumes is deteriorated, and when the water ejection amount falls below 20 l/min, the number of the water droplets ejected from the spray nozzle 50 becomes too small, whereby the collision rate between the water droplets and the welding fumes is deteriorated also in this case.

(2) Water Ejection Angle from Spray Nozzle 50

An optimal water ejection angle from the spray nozzle 50 is in a range from 160 to 170 degrees with respect to the air flow direction. The present experiments have shown that when the water ejection angle is set within this range, the impact surface with the wind (air flow) is maximized, and the effect of atomization of water droplets also becomes optimal.

(3) Passage Cross-Sectional Area of Throat Portion 41

With respect to the passage cross-sectional area of the throat portion 41, a range from 10,000 to 12,000 mm$^2$ is optimal. The present experiments have shown that when the passage cross-sectional area of the throat portion 41 exceeds 12,000 mm$^2$, flow velocity of air in the throat portion 41 becomes too slow, whereby the effect of atomization of water droplets is deteriorated, and when the passage cross-sectional area of the throat portion 41 fall below 10,000 mm$^2$, the flow rate of air in the throat portion 41 cannot be sufficiently secured, and the environment of the welding work area 1c is therefore deteriorated, accompanying a decrease in the dust removing efficiency.

(4) Length of Throat Portion 41

An optimal length of the throat portion 41 (length in the air flow direction) is in a range from 100 to 120 mm. The present experiments have shown that when the length of the throat portion 41 exceeds 120 mm, the velocity difference between the water droplets and the air disappears, whereby an unnecessary pressure loss is generated, and when the length of the throat portion 41 is less than 100 mm, the time during which the water droplets and the air can collide becomes insufficient, and the collision rate between the water droplets and the welding fumes is deteriorated.

(5) Water Surface Height in Tank 13

An optimal interval dimension between the water surface in the tank 13 and the bottom surface of each of the towers 11 and 12 is in a range from 200 to 250 mm. The present experiments have shown that when the interval dimension exceeds 250 mm, the welding fumes hardly reach the water surface, and the fire extinguishing ability is deteriorated, and when the interval dimension falls below 200 mm, the flow velocity of the air near the water surface becomes high, and the welding fumes having coalesced with water droplets are separated, so that the dust removing efficiency is decreased.

Figure 7:
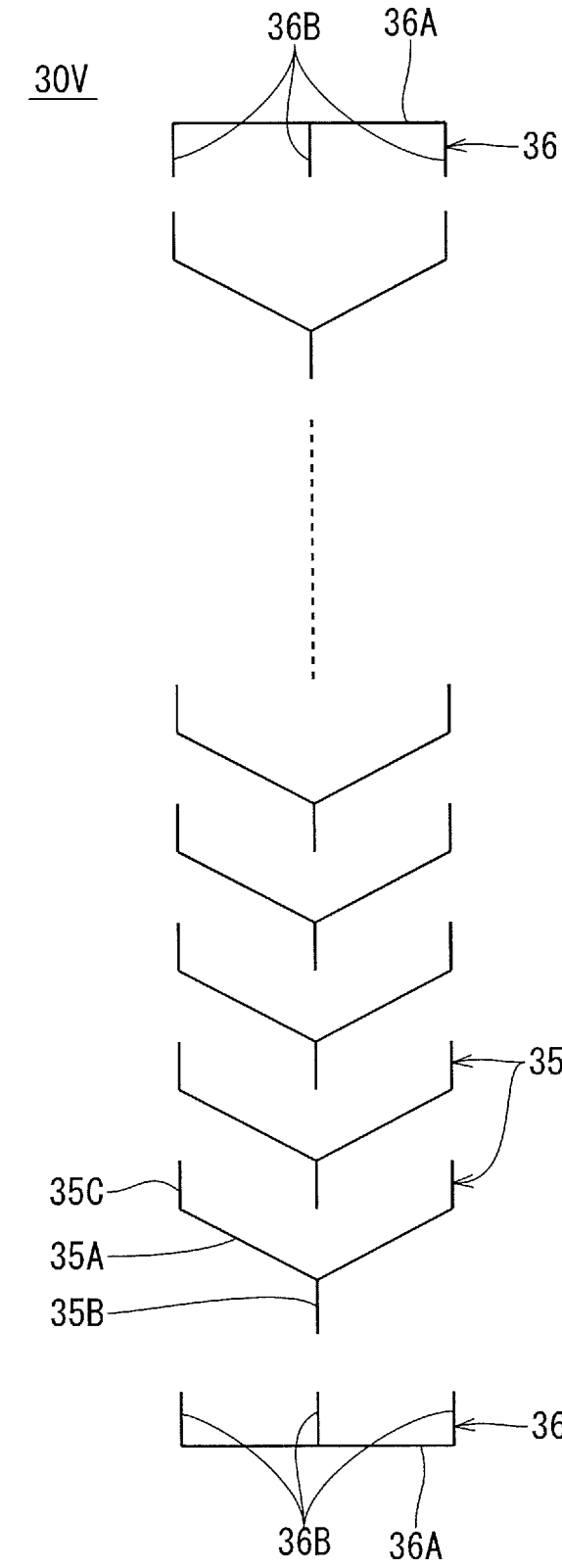
FIG. 7 is a cross-sectional side view of an eliminator according to a modification.

OTHER EMBODIMENTS (1) Instead of the eliminator 30 of the dust collector 10 of the above embodiment, an eliminator 30V having the cross-sectional structure illustrated in FIG. 7 may be provided. The eliminator 30V includes a plurality of elongated barrier members 35 that extend in the direction perpendicular to the paper surface of FIG. 7 and are arranged in a side-by-side manner. The barrier members 35 each include: a groove-shaped body 35A having a V-shaped cross-section; a first projection wall 35B projecting from an outer surface corner part of the groove-shaped body 35A and positioned in a central plane of the groove-shaped body 35A; and second projection walls 35C and 35C that project from both side part of the groove-shaped body 35A and are parallel to the central plane of the groove-shaped body 35A. The plurality of barrier members 35 are arranged in parallel in the same direction with their central planes coinciding with each other. In addition, the first projection wall 35B of one barrier member 35 of the adjacent barrier members 35 and 35 is disposed between the second projection walls 35C and 35C of the other barrier member 35. Furthermore, barrier members 36 are disposed on the both end parts of the barrier members 35 group. The barrier member 36 is configured such that projection walls 36B project toward the barrier members 35 group from both sides and from the center of a strip-shaped member 36A. The eliminator 30V is configured such that the longitudinal both end parts of the barrier members 35 and 36 are fixed to support members.

(2) A bottom part of the tank 13 of the above embodiments may be a hopper portion that is tapered downward, and an openable and closable discharge port may be provided at a lower end part of the hopper portion. With that arrangement, foreign matters constituted by the welding fumes accumulated in the tank 13 can be easily collected and discharged.

Figure 8:
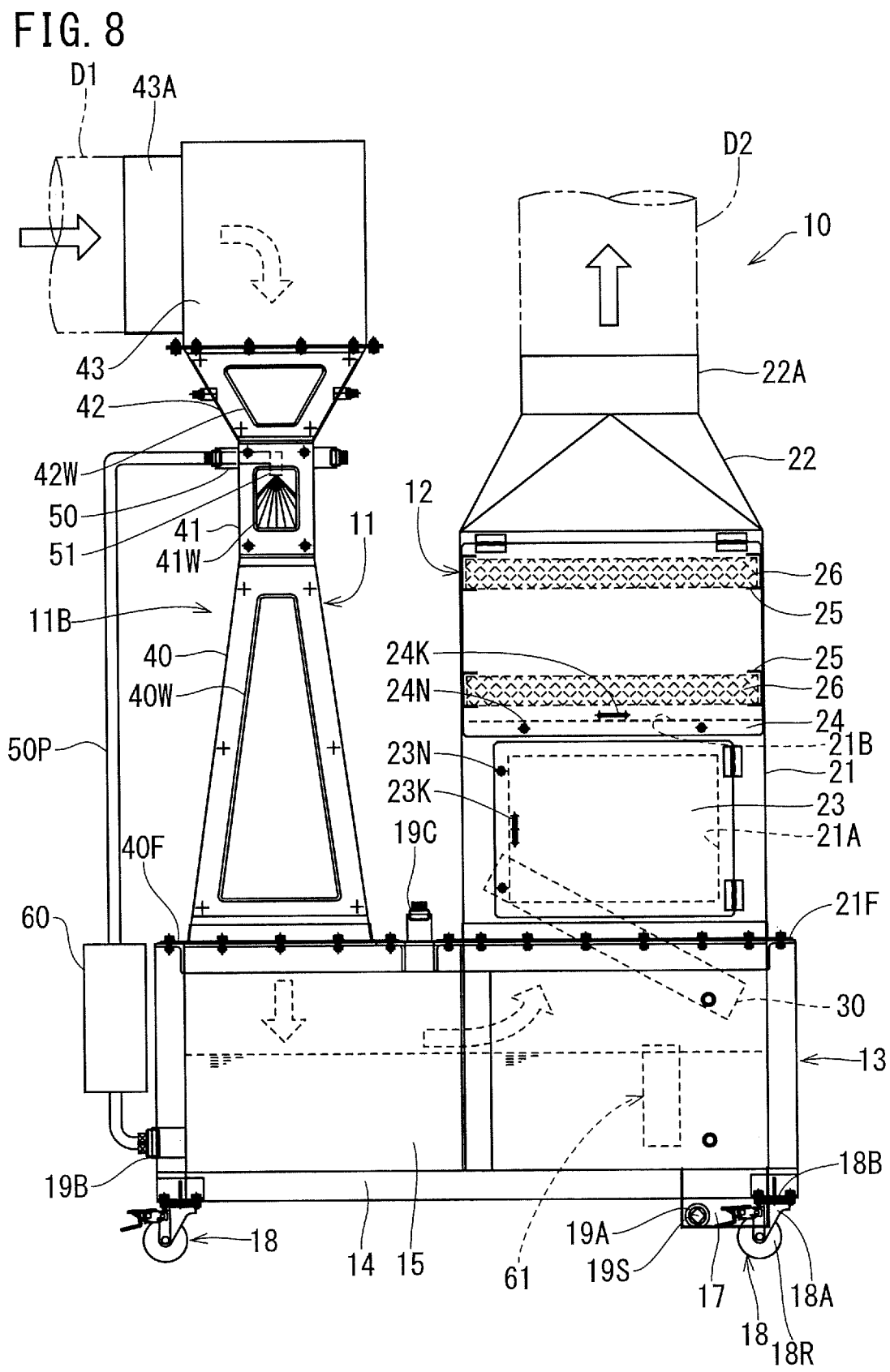
FIG. 8 is a front view of a dust collector according to a modification.

(3) As shown in FIG. 8, the tank 13 may be provided with a wave dissipation wall 61 that is bridged between the pair of walls on the long-side side and immersed in an upper part of the stored water. With this arrangement, the stored water is suppressed from waving, and water splash can be suppressed from occurring. A plurality of wave dissipation walls 61 may be provided in the longitudinal direction of the tank 13.

Figure 9:
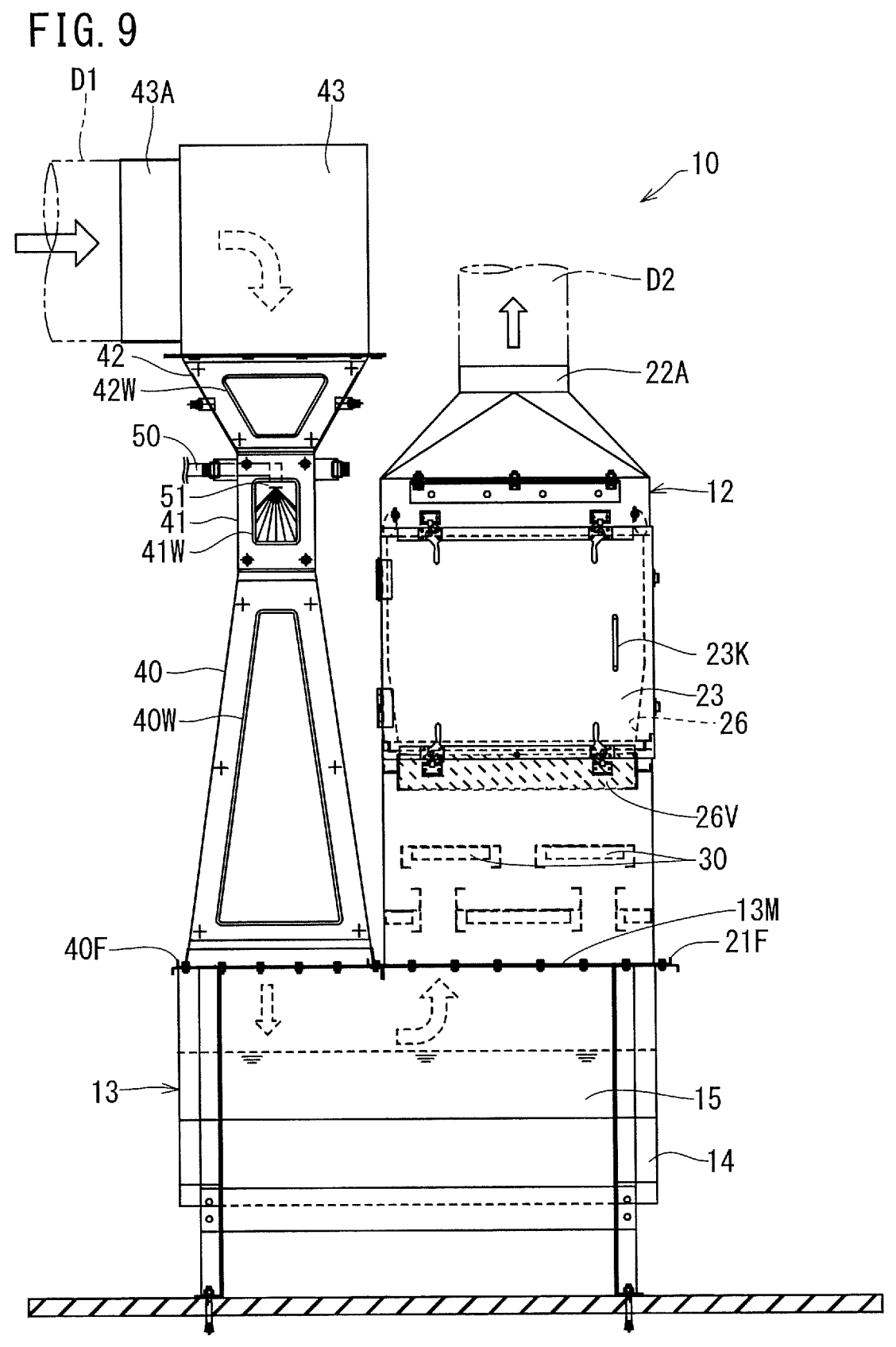

(4) Only the filters 26 may be provided in the second tower 12 without providing the eliminator 30. Furthermore, for example, as illustrated in FIG. 9, a demister filter 26V may be provided between the eliminator 30 and the filter 26. In FIG. 9, the second opening 21B is not provided, and the first opening 21A is formed from a position near the upper end of the side wall on the front side of the second tower body 21 to a vertically intermediate position and, horizontally entirely. The eliminator 30, the filter 26, and the demister filter 26V can be replaced through the first opening 21A.

Figure 10:
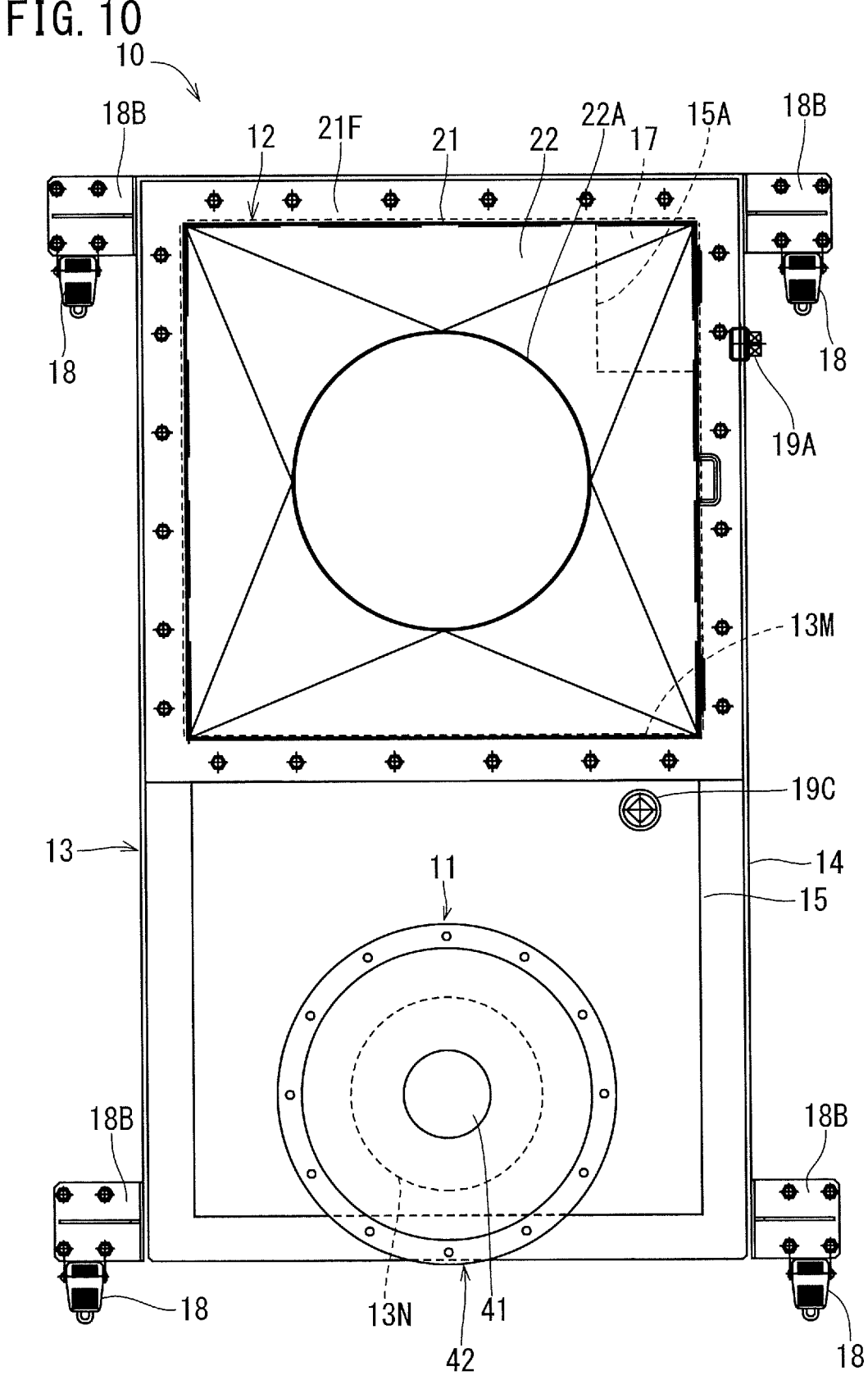
FIG. 10 is a plan view of a dust collector according to a modification.

(5) The first tower 11 and the second tower 12 of the above embodiments have a rectangular cylindrical shape with a square cross-section, but may have a rectangular cylindrical shape with a cross-section other than a square, or may have a circular cylindrical shape. In addition, for example, as illustrated in FIG. 10, the first tower 11 may have a circular cylindrical shape with a circular cross-section, and the second tower 12 may have a rectangular cylindrical shape with a square cross-section.

(6) In the above embodiments, the air discharged from the dust collector 10 is separated to flow in the indoor area and in the welding work area 1c, but the present invention is not limited thereto, and the air discharged from the dust collector 10 may be separated to flow in the outdoor area and in the welding work area 1c, or may be separated to flow in the indoor area, in the outdoor area, and in the welding work area 1c.

(7) In the above embodiments, the throat portion 41 is provided only at one place of the first tower 11, but for example, the throat portions 41 may be provided at a plurality of places of the first tower 11. In that case, it is preferable that each throat portion 41 is provided with a spray nozzle 50.

(8) In the above embodiments, the casters 18 are provided, and the dust collector 10 is configured to be movable; however, for example, as illustrated in FIG. 9, the casters 18 may not be provided, and the dust collector 10 may be configured to be fixed to the floor.

(9) In the above embodiments, the spray nozzle 50 is used to generate mist, but for example, a normal nozzle may be used instead of the spray nozzle 50. Specifically, the configuration may be such that the nozzle is used to cause water to flow along the inner side surface of the first tower 11 (in detail, along the inner side surface of the upper pyramid portion 42) and such that the water changes into mist when passing through the bottleneck structure portion 11B. In such a case, the bottleneck structure portion 11B corresponds to a "mist generator" in the claims.

DESCRIPTION OF THE REFERENCE NUMERAL

10 dust collector
11 first tower
11B bottleneck structure portion
12 second tower
13 tank
26 filter
30, 30V eliminator
40 lower pyramid portion
40W, 41W, 42W window portion
41 throat portion
42 upper pyramid portion
43A air introduction portion
50 spray nozzle

The invention claimed is:

1. A dust collector that collects welding fumes, the dust collector comprising:

a tank that stores water in a non-full state;

a first tower that stands upright from an upper surface of the tank, and is configured to receive air containing the welding fumes from an upper part of the first tower and to guide the air to the tank;

a second tower that stands upright from the upper surface of the tank, and is configured such that air discharged from the tank passes through the second tower;

a bottleneck structure portion in which a vertically intermediate part of the first tower is narrowed;

a mist generator configured to generate mist in the first tower; and a filter housed in the second tower, wherein:

an eliminator is housed in a part of the second tower, and a plurality of the filters are housed above the eliminator at intervals, the eliminator includes a plurality of barrier layers, each barrier layer having a plurality of elongated main plate portions disposed on a same plane with gaps between the respective main plate portions, the gaps between the main plate portions of each barrier layer are arranged so as to be shifted from the gaps in an adjacent barrier layer in a direction transverse to the same plane, each main plate portion includes, at two ends, side walls extending perpendicular to the main plate portion, and tip ends of the side wall are bent at a right angle to face the main plate portion.

2. The dust collector according to claim 1, wherein adjacent opening edges of lower end openings of the first tower and the second tower are arranged in parallel.

3. The dust collector according to claim 1, wherein the mist generator is configured to eject mist downward.

4. The dust collector according to claim 1, wherein the bottleneck structure portion includes:

a throat portion that has a substantially uniform cross-sectional shape and extends in a vertical direction, the mist generator being disposed inside the throat portion;

a lower pyramid portion expanding downward from the throat portion; and an upper pyramid portion that expands upward from the throat portion, is shorter than the lower pyramid portion, and has a larger expansion angle than an expansion angle of the lower pyramid portion.

5. The dust collector according to claim 2, wherein the bottleneck structure portion includes:

a throat portion that has a substantially uniform cross-sectional shape and extends in a vertical direction, the mist generator being disposed inside the throat portion;

a lower pyramid portion expanding downward from the throat portion; and an upper pyramid portion that expands upward from the throat portion, is shorter than the lower pyramid portion, and has a larger expansion angle than an expansion angle of the lower pyramid portion.

6. The dust collector according to claim 3, wherein the bottleneck structure portion includes:

a throat portion that has a substantially uniform cross-sectional shape and extends in a vertical direction, the mist generator being disposed inside the throat portion;

a lower pyramid portion expanding downward from the throat portion; and an upper pyramid portion that expands upward from the throat portion, is shorter than the lower pyramid portion, and has a larger expansion angle than an expansion angle of the lower pyramid portion.

7. The dust collector according to claim 1, further comprising a window portion in a part of the bottleneck structure portion, the window portion including a translucent member.

8. The dust collector according to claim 2, further comprising a window portion in a part of the bottleneck structure portion, the window portion including a translucent member.

9. The dust collector according to claim 3, further comprising a window portion in a part of the bottleneck structure portion, the window portion including a translucent member.

10. The dust collector according to claim 4, further comprising a window portion in a part of the bottleneck structure portion, the window portion including a translucent member.

11. The dust collector according to claim 1, further comprising an air introduction portion provided on an upper part of the bottleneck structure portion and on a surface opposite to the second tower, and configured to receive the air.

12. The dust collector according to claim 2, further comprising an air introduction portion provided on an upper part of the bottleneck structure portion and on a surface opposite to the second tower, and configured to receive the air.

13. The dust collector according to claim 3, further comprising an air introduction portion provided on an upper part of the bottleneck structure portion and on a surface opposite to the second tower, and configured to receive the air.

14. The dust collector according to claim 4, further comprising an air introduction portion provided on an upper part of the bottleneck structure portion and on a surface opposite to the second tower, and configured to receive the air.

15. The dust collector according to claim 1, wherein a flow path cross-sectional area of a narrowest part of the first tower is $\frac{1}{10}$ to $\frac{1}{20}$ times a flow path cross-sectional area of a widest part of the second tower.

16. The dust collector according to claim 2, wherein a flow path cross-sectional area of a narrowest part of the first tower is $\frac{1}{10}$ to $\frac{1}{20}$ times a flow path cross-sectional area of a widest part of the second tower.

17. The dust collector according to claim 1, further comprising:

a hopper provided on a bottom part of the tank; and a discharge port that is provided on a lower end part of the hopper and is openable and closable.

18. The dust collector according to claim 1, further comprising a plurality of casters that support a whole of the dust collector.

19. The dust collector according to claim 1, wherein the eliminator is inclined in a downward direction relative to a bottom of the second tower.

20. The dust collector according to claim 1, further comprising a wave dissipation wall provided in the tank.

\*  \*  \*  \*  \*